United States Patent [19]

Yamaoka

[11] Patent Number: 4,686,520

[45] Date of Patent: Aug. 11, 1987

[54] DIGITAL COLOR ENCODER

[75] Inventor: Shigemitsu Yamaoka, Hamamatsu, Japan

[73] Assignee: Nippon Gakki Seizo Kabushiki Kaisha, Hamamatsu, Japan

[21] Appl. No.: 678,163

[22] Filed: Dec. 4, 1984

[30] Foreign Application Priority Data

Dec. 6, 1983 [JP] Japan ................... 58-231017
Dec. 6, 1983 [JP] Japan ................... 58-231018
Jan. 19, 1984 [JP] Japan ................... 59-008114

[51] Int. Cl.$^4$ ........................... G09G 1/28
[52] U.S. Cl. ................... 340/703; 340/701; 358/27; 358/30
[58] Field of Search ............... 340/701, 703, 793; 358/23, 25, 27, 903, 15, 16, 13, 30

[56] References Cited

U.S. PATENT DOCUMENTS

| | | | |
|---|---|---|---|
| 4,278,972 | 7/1981 | Wozniak | 340/703 |
| 4,303,912 | 12/1981 | Stafford et al. | 340/703 |
| 4,355,327 | 10/1982 | Nagumo et al. | 358/13 |
| 4,442,428 | 4/1984 | Dean et al. | 340/703 |
| 4,533,909 | 8/1985 | Sauder | 340/703 |
| 4,578,673 | 3/1986 | Yianilos et al. | 340/703 |

FOREIGN PATENT DOCUMENTS

55-35536 3/1980 Japan ................... 340/703

Primary Examiner—Gerald L. Brigance
Attorney, Agent, or Firm—Cushman, Darby & Cushman

[57] ABSTRACT

A digital color encoder for producing color TV signal comprises primary color image signal sources, a sampling signal generator, coefficient memories, multipliers and an adder. The primary color image signal sources provide digitized color image signals respectively of red, green and blue. The sampling signal generator generates a sampling clock having a frequency three times as high as that of the chrominence subcarrier and provide three phase sampling signals for 0°, 120° and 240° having a frequency as same as that of the chrominence subcarrier. The coefficient memories provide coefficients for 0°, 120° and 240° for the respective color of red, green and blue according to the formula of NTSC color picture signal. The respective color image signals are sampled at the sampling clock frequency and respectively multipled with the respective coefficients in the multipliers, and then added together in the adder. This a composite color video signal is synthesized without use of ordinary subcarrier modulators for B−Y and R−Y.

7 Claims, 9 Drawing Figures

DIGITAL COLOR ENCODER

BACKGROUND OF THE INVENTION (a) Field of the Invention

This invention relates to a digital color encoder for producing such composite color video signals as an NTSC signal directly from digitized primary color singals.

(b) Description of the Prior Art

Generally a color picture signal E(t) of an NTSC system is given by the following formula $$E(t) = Y + 0.493 (B-Y) \sin \omega t + 0.877 (R-Y) \cos \omega t \quad (1)$$

wherein Y represents a luminance signal, B−Y represents a color difference signal of blue and R−Y represents a color difference signal of red. These are given by the following formulae from primary color signals R, G and B of red, green and blue colors respectively:

$$Y = 0.299R + 0.587G + 0.114B \quad (2)$$

$$B - Y = -0.299R - 0.587G + 0.886B \quad (3)$$

$$R - Y = 0.701R - 0.587G - 0.114B \quad (4)$$

In the formula (1), $\omega = 2\pi f = 2\pi \times 3.579545$ MHz, where f represents a chrominance subcarrier frequency (=3.579545 MHz).

In a conventional digital color encoder, digitized primary color signals R, G and B are converted to a luminance signal Y and chrominance signals I and Q corresponding to color difference signals R−Y and B−Y; and then a composite color video signal is formed through modulation of a chrominance subcarrier by means of an analog balanced modulator or the like.

In this system, signal sources are individually required, the freedom in the color picture image is low on the digitizing process and computation process, the circuit formation is complicated and the cost of construction is very high.

SUMMARY OF THE INVENTION

In order to eliminate the above described defects, a primary object of the present invention is to provide a digital color encoder wherein a composite color video signal is produced directly from predetermined coefficients provided for sampled phases of the chrominance subcarrier and digitized primary color signals for three regular primary colors(red, green and blue) or any other primary colors.

According to this invention, the analysis is made by sampling a color video signal at a sampling frequency which is an integer times as high as the chrominance subcarrier frequency to obtain coefficients of the respective primary color signals for the respective sampling phases. Based on this analysis, the respective primary color signals appearing at the sampling frequency in a digital representation are multiplied by those coefficients at the respective phase timings, and by combining the multiplied results a composite color video signal is produced. That is to say, in the above mentioned formula (1), when a color picture signal is sampled at a sampling frequency of 10.738635 MHz which is 3 times as high as the chrominance subcarrier frequency 3.579545 MHz and the respected sampling phases are substituted in the above mentioned formulae (2), (3) and (4), then the color picture signals of respective phases shown in the following will be obtained.

$$E (0\pi/3\omega) = 0.91378R + 0.07220G + 0.01402B \quad (5)$$

$$E (2\pi/3\omega) = -0.13605R + 0.59378G + 0.54227B \quad (6)$$

$$E (4\pi/3\omega) = 0.11927R + 1.09502G + 0.21429B \quad (7)$$

In the present invention, using the formula a color picture signal is sampled at a sampling frequency which is an integer times as high as the chrominance subcarrier frequency to determine coefficients to the respective primary color signals for the respective sampling phases. Then the digitized primary color signals R, G and B of the respective phases and their corresponding coefficients are multiplied at the respective phases to produce color picture signal samples for the respective phases and these are combined to form a composite color signal to constitute a picture image on a TV screen.

Another object of the present invention is to provide a digital color encoder of the above mentioned type wherein the values of the above mentioned coefficients can be variably set to improve the video coloring function. Thereby the freedom of color graphic synthesis can be expanded.

Further, another object of the present invention is to provide a digital color encoder of the above mentioned type wherein the defects in the case of setting the sampling frequency to be an odd number times as high as the chrominance subcarrier frequency are eliminated to realize an accurate color picture image of the NTSC system.

According to the present invention, a first color picture signal formula and a second color picture signal formula having subcarrier terms whose phases are different from each other by 180 degrees are sampled at a sampling frequency which is an odd number times as high as the chrominance sybcarrier frequency and the coefficients to the respective primary color signals are determined for the respective sampling phases, and then the digitized primary color signals of the respective phases and their corresponding coefficients are multiplied at the respective phases to produce a composite color video signal for obtaining a picture image by alternating a first color picture signal samples for the respective phases and a second color picture signal samples for the respective phases, and these first samples and second samples are alternately employed for every other horizontal line period and are combined to form a composite color signal to constitute a picture image on a TV screen.

In this case, for the primary color signals, there can be used not only the predigitalized three primary color signals R, G and B but also such primary color signals as of cyan, magenta and yellow.

These and other objects of the present invention will become more apparent during the course of the following detailed description and appended claims.

DESCRIPTION OF THE PREFERRED EMBODIMENTS

Figure 1:
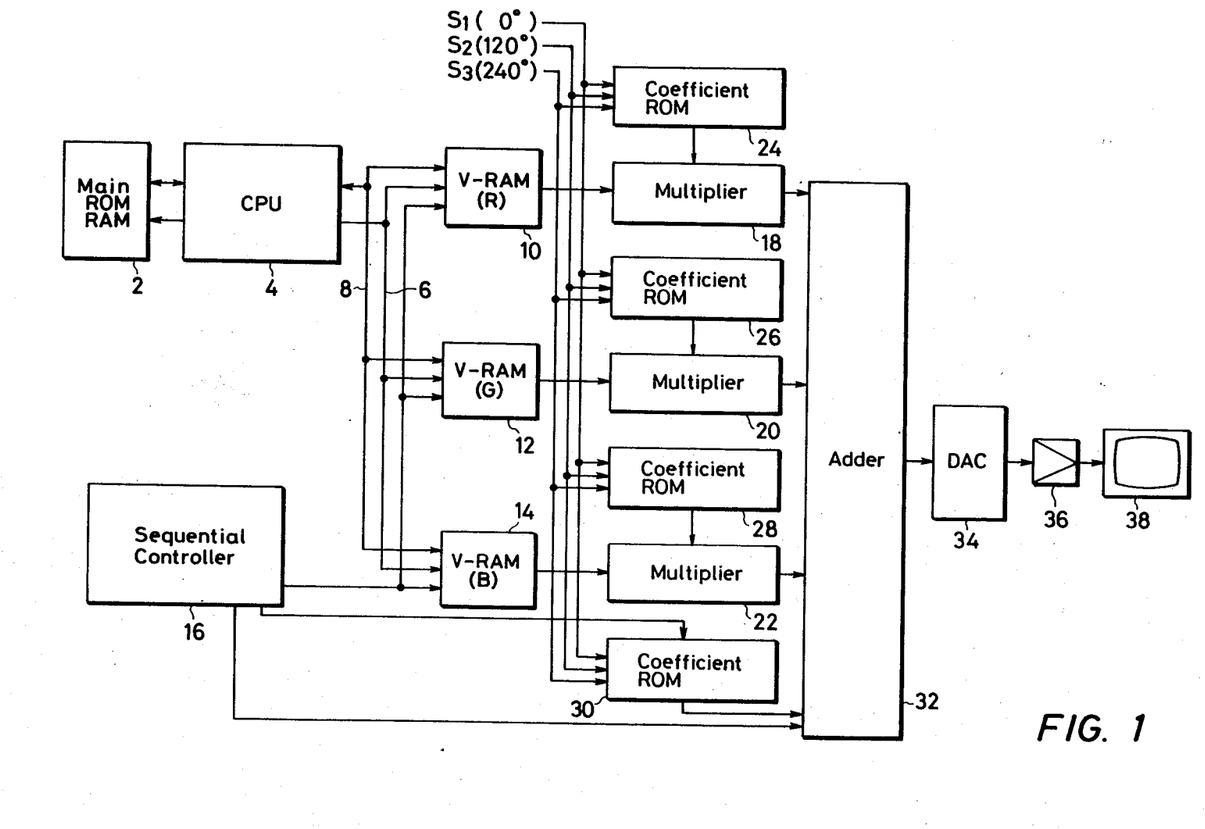
FIG. 1 is a block diagram showing an embodiment of the digital color encoder according to the present invention.

FIG. 1 shows an embodiment of the digital color encoder of this invention. This embodiment shows the case of producing arbitrary desired color video image for a TV receiver by using a computer.

In FIG. 1, a main memory unit 2 is formed of a read only memory (ROM) and a read/write memory (RAM). Color video displaying programs are written in the ROM and processing data are stored in the RAM. A central processing unit (hereinafter, CPU) 4 is associated with this main memory unit 2. This CPU 4 reads out processing programs and necessary data from the main memory unit 2 in response to commands and conducts processing. Video memories (hereinafter, V-RAM) 10, 12 and 14 are connected to this CPU 4 through a data bus 6 and an address bus 8 so that address signals are given to the respective V-RAM 10, 12 and 14 from a sequential controller 16. Color information constituted by the digitized respective primary color signals of R, G and B are individually memorized for the respective hues (primary colors) in the V-RAM 10, 12 and 14. The contents of these data to be memorized are produced in the CPU 4 or renewed in the CPU 4. The sequential controller 16 produces a synchronizing pulse of NTSC and a timing pulse for a color burst signal, and further produces the above mentioned address signals for the V-RAM 10, 12 and 14, and reads out the respective primary color signals of R, G, and B in conformity with the picture timing of a TV screen. The signals indicative of R, G and B read out of the V-RAM 10, 12 and 14 are applied respectively to multipliers 18, 20 and 22 respectively provided for the V-RAM 10, 12 and 14 and are multiplied by predetermined coefficients read out of coefficient memories (hereinafter, coefficient ROM) 24, 26 and 28 for the respective multipliers 18, 20 and 22. The respective coefficient ROMs 24, 26 and 28 memorize the coefficients to R, G and B of the formulae (5), (6) and (7) for the respective sampling phases and produce predetermined coefficients when phase sampling signals $S_1(0°)$, $S_2(120°)$ and $S_3(240°)$ are given. The phase sampling signals are staggered in phase and have a frequency of the chrominance subcarrier. These signals are generated based on the sampling clock of a herein-below mentioned sampling frequency. The respective coefficients are numerical values obtained by sampling the color video signal formula at a sampling frequency which is an integer number times as high as the chrominance subcarrier frequency (f=3.579545 MHz) for the respective sampling phases (angular periods of 360°/n, where n is the integer) and for each primary color. These coefficient values are calculated in advance and are memorized in the coefficient ROMs 24, 26 and 28. A coefficient memory (hereinafter, a coefficient ROM) 30 memorizes a color burst signal and produces a color burst signal by the timing pulse from the sequential controller 16 together with the above mentioned phase sampling signals $S_1(0°)$, $S_2(120°)$ and $S_3(240°)$. The color burst signal produced by the coefficient ROM 30, multiplied outputs of the respective multipliers 18, 20 and 22 and a synchronizing signal from the sequential controller 16 are applied to an adder 32 as a combining means and are added together therein. This adder 32 adds the multiplied outputs of the multipliers 18, 20 and 22 on the respective terms of R, G and B of the above mentioned formulae (5), (6) and (7) to produce a synthesized color picture signal for obtaining a picture image, and adds a color burst signal and a synchronizing signal to the above added results. This added output forms a digital composite color signal of NTSC, which is applied to a D/A converter (hereinafter DAC) 34 so as to be converted into an analog signal, which then in turn is amplified in an amplifier 36 and applied to a TV display 38.

According to such formation, the primary color signals R, G and B processed and produced in the CPU 4 are memorized in the V-RAM 10, 12 and 14 in the form of digital samples, and these primary color signals are read out in conformity with the picture timing of the TV screen 38 by the address signals produced by the sequential controller 16. These primary color signals correspond to the respective R, G and B of the above mentioned formulae (5), (6) and (7). On the other hand, the phase sampling signals $S_1(0°)$, $S_2(120°)$ and $S_3(240°)$ are applied to the coefficient ROM 24, 26 and 28, and then the coefficients corresponding to the respective phase sampling signals, that is, the coefficients for the respective phases are read out. The coefficients for the respective phases and the above mentioned primary color signals R, G and B are computed at the respective phases by the multipliers 18, 20 and 22 on the basis of the predetermined sampling clock frequency, to thereby produce color picture signal samples at the respective phases.

Figure 2:
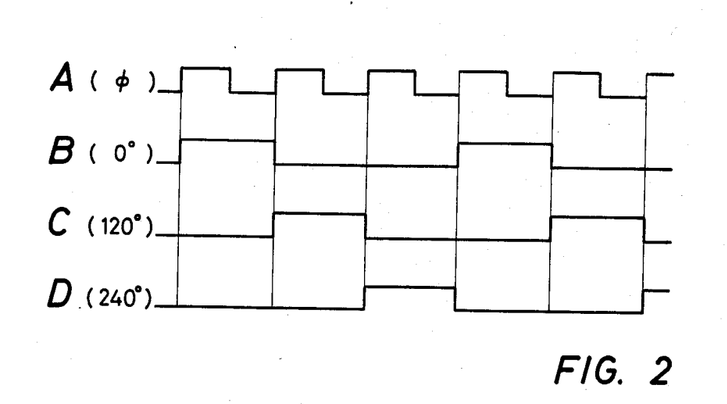
FIG. 2 is an explanatory wave chart showing the relations between a sampling clock signal and 3-phase sampling signals.
Figure 3:
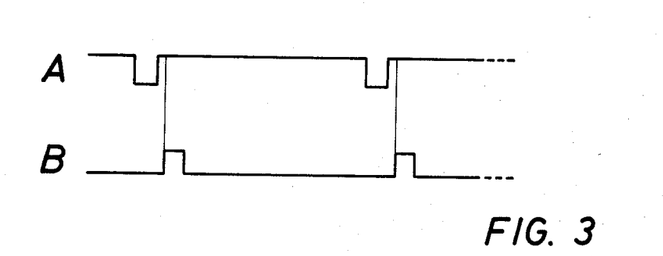
FIG. 3 is an explanatory wave chart showing a production timing of a color burst signal with respect to a horizontal synchronizing signal.

In FIG. 2, A shows a sampling clock signal and B, C and D show respectively phase sampling signals $S_1$, $S_2$ and $S_3$. The respective phase sampling signals $S_1$, $S_2$ and $S_3$ are three-phase signals which have the same frequency as the chrominance subcarrier and in which the phases are staggered by 120 degrees from one another. The high level period is set to be the same as the period of the sampling clock. In this way, when the coefficients read out with these phase sampling signals $S_1$, $S_2$ and $S_3$ are multiplied in turn by the primary color signals, the processing will be synchronized with the sampling clock frequency. When the color burst signal and a synchronizing signal read out of the coefficient ROM 30 are applied to the thus obtained color picture signal by the adder 32, a digital composite color signal will be produced. In this case, if the synchronizing signal is represented by A in FIG. 3, the color burst signal will be at the timing shown by B in FIG. 3. In reality, 8 to 10 cycles of the chrominance subcarrier are inserted before the synchronizing signal. This digital composite color signal is converted into a composite color signal of NTSC by the DAC 34, is amplified by the amplifier 36 and then can be put out as a picture image on the TV screen 38.

Figure 4:
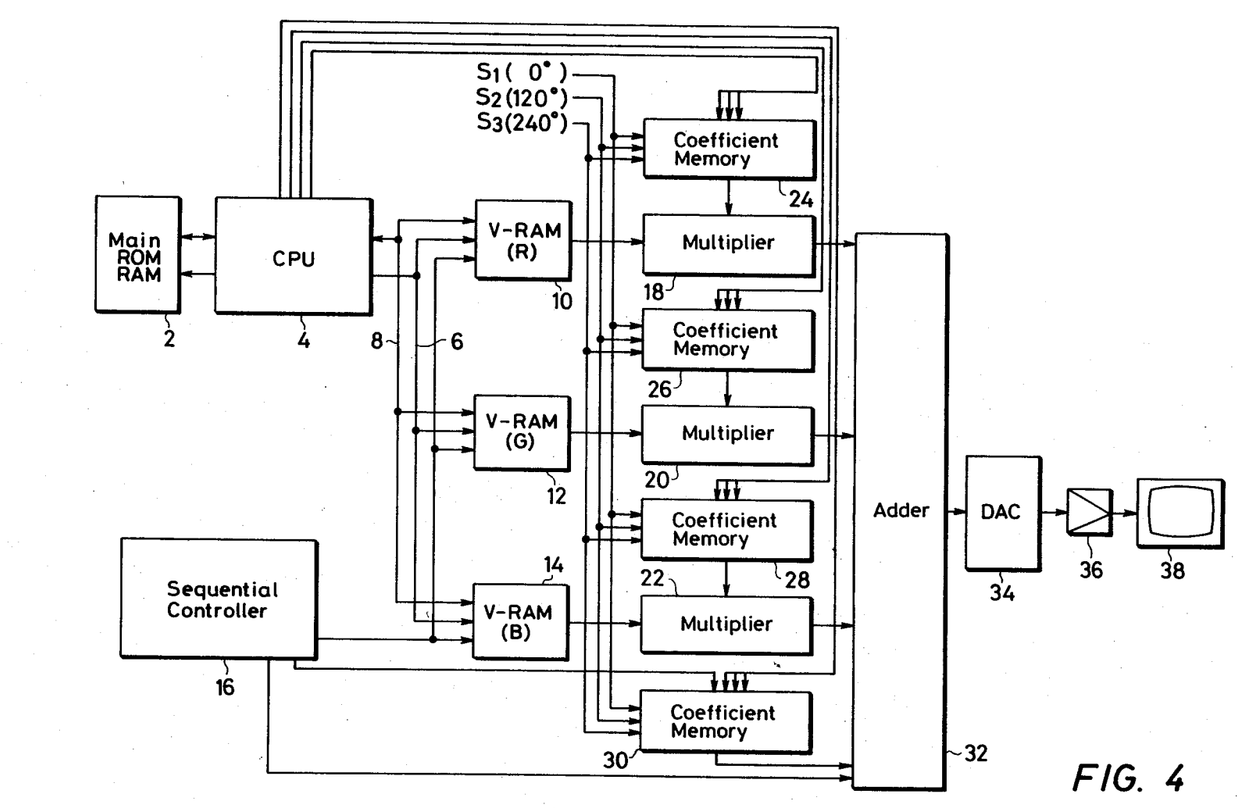
FIG. 4 is a block diagram showing another embodiment of the digital color encoder according to the present invention.

FIG. 4 shows another embodiment of the digital color encoder according to the present invention. This embodiments wherein the same reference numerals are respectively attached to the components identical with or similar to those of the embodiments shown in FIG. 1 is different from the embodiment of FIG. 1 in respect that each of the coefficient memories 24, 26, 28 and 30 is formed of read/write memory (RAM) or a register. That is to say, even in this embodiment, when the phase sampling signals, $S_1$, $S_2$, $S_3$ are given, predetermined coefficients will be produced and the coefficient values stored there can be changed according to a modifying instruction from the CPU.

Thus, when the coefficient memories 24, 26 and 28 are formed of RAMs or registers controllable directly by the CPU 4, the stored coefficient setting values can be varied to desired values and therefore the picture image hue processing function will be improved. Also, in case the coefficient memories 24, 26 and 28 are able to directly vary the coefficient setting values by the CPU, the primary color signal inputs can be changed over from such color information signals as primary color signals of R, G, B, cyan, magenta and yellow to such other color information signal as a luminance signal Y and color difference signals R−Y and B−Y, and thus the freedom of the hue synthesis will be expanded. Further, the hue phases can be varied by varying the coefficient values stored in the coefficient memory 30.

In these embodiments, the sampling frequency is set to be three times (=10.738635 MHz) as high as the chrominance subcarrier frequency, but can be set to be any integer times as high as the luminance subcarrier frequency.

Figure 5:
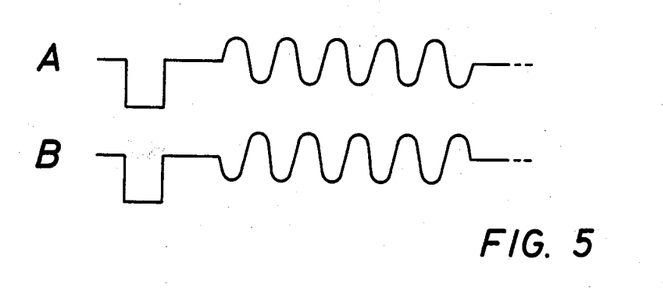
FIG. 5 is an explanatory wave chart showing difference of the phases of color burst signals.

An example of the formation of a composite color signal will be explained in the following. In case the sampling frequency is set to be 3 times (=10.738635 MHz) as high as the chrominance subcarrier frequency. Then, the division of this 10.738635 MHz by the horizontal scanning frequency of 15.73426 kHz of the TV receiver 38 results in:

$$10.738635 \text{ MHz}/15.73426 \text{ kHz} = 682.5 \qquad (8)$$

which is not an integer. Therefore, by the sampling clock signal of the sampling frequency of 10.738635 MHz which is 3 times as high as the chrominance subcarrier frequency, it is difficult to form the length of a horizontal synchronizing period of 1H and an accurate color picture image of NTSC can not be reproduced. In order to produce an accurate color picture image of NTSC, the phase of the color burst signal should not vary with each horizontal scanning line. Now, when the chrominance subcarrier frequency of 3.579545 MHz is divided by the horizontal scanning frequency of 15.73426 kHz, $$3.579545 \text{ MHz}/15.73426 \text{ kHz} = 227.5 \qquad (9),$$

the length of the horizontal synchronizing period of 1H will not be an integer times as long as the wave length of the color burst signal and an excess of half a wave length will occur. Therefore, a normal color burst signal shown by A in FIG. 5 will be followed by such a color burst signal as is shown by B in FIG. 5. This color burst has a phase which is shifted by 180 degrees per each horizontal synchronizing period of 1H. As is understood from the formulae (7) and (8), in case the formula (1) is sampled by 10.738635 MHz and the length of the horizontal synchronizing period of 1H is made 63.5555 μs (=1/15.73426 kHz), formation of the color picture image of NTSC will become impossible.

Here, from the formula (1), the first color picture signal $E_1(t)$ will be given by $$E_1(t) = Y + 0.493 \ (B-Y) \sin \omega t + 0.877 \ (R-Y) \cos \omega t \qquad (1)'.$$

The second color picture signal $E_2(t)$ will be obtained by giving a phase shift of 180 degrees $(-\pi)$ to the formula (1) and will be $$E_2(t) = Y + 0.493 \ (B-Y) \sin (\omega t - \pi) + 0.877 \ (R-Y) \cos (\omega t - \pi).$$

This is rewritten as:

$$E_2(t) = Y - 0.493 \ (B-Y) \sin \omega t - 0.877 \ (R-Y) \cos \omega t \qquad (10).$$

Figure 6:
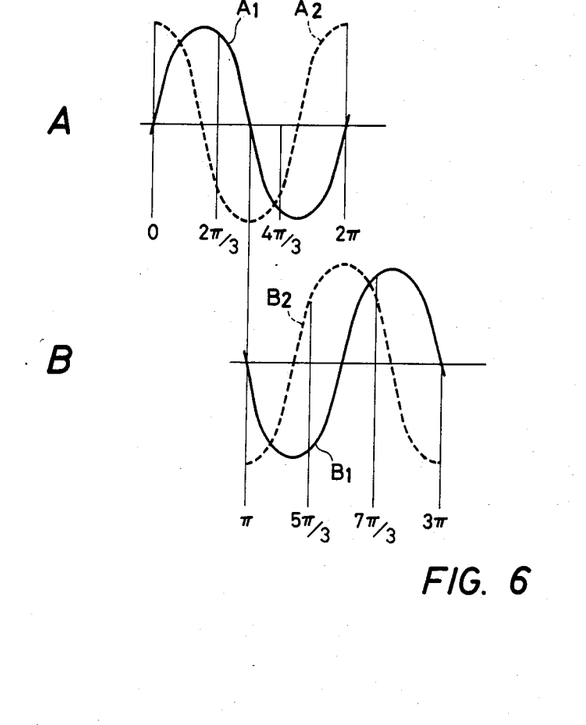
FIG. 6 is an explanatory wave chart showing chrominance subcarrier components of the first and second color picture signals.

FIG. 6 shows alternating current components in the first and second color picture signals. In FIG. 6, A represents the first color picture signal, B represents the second color picture signal, $A_1$ and $B_1$ represent the terms of sin ωt and $A_2$ and $B_2$ represent the terms of cos ωt. A and B shows that the first color picture signal $E_1(t)$ and the second color picture signal $E_2(t)$ have a phase difference of 180 degrees from each other. When the first color picture signal $E_1(t)$ is sampled by a sampling frequency which is an odd number (e.g. three herein) times as high as the chrominance subcarrier frequency and the formulae (2), (3) and (4) are respectively substituted therewith, such color picture signals as in the formulae (5), (6) and (7) will be obtained for the respective phases about the first color video signal $E_1(t)$ as in the following:

$$E_1 \ (0\pi/3\omega) = 0.91378R + 0.07220G + 0.01402B \qquad (5)'$$

$$E_1 \ (2\pi/3\omega) = -0.13605R + 0.59378G + 0.54227B \qquad (6)'$$

$$E_1 \ (4\pi/3\omega) = 0.11927R + 1.09502G - 0.21429B \qquad (7)'.$$

If the same is carried out about the second color picture signal $E_2(t)$, the color picture signals for the respective phases will be obtained in the same manner. These will be obtained also by directly substituting the formula (1) with 3π/3ω, 5π/3ω and 7π/3ω, and the color picture signals of the respective phases will be:

$$E_2 \ (3\pi/3\omega) = -0.31578R + 1.10180G + 0.21398B \qquad (5)''$$

$$E_2 \ (5\pi/3\omega) = 0.47873R + 0.07898G + 0.44229B \qquad (6)''$$

$$E_2 \ (7\pi/3\omega) = 0.73405R + 0.58022G - 0.31427B \qquad (7)''.$$

The thus obtained color picture signals for the respective phases of the first color picture signal and color picture signals for the respective phases of the second color picture signal are synthesized alternately for each horizontal line period to produce a synthesized color picture signal, and in turn an accurate composite color signal of NTSC can be produced.

In such case, for the primary color signals, there can be used not only predigitized three primary color signals R, G and B but also such primary color signals as of cyan, magenta and yellow.

Further, as evident from the formulae (5)', (6)', (7)', (5)", (6)" and (7)", the color picture signals of the respective phases of the first and second color picture signals consist of common terms having different coefficients and therefore can be formed by modification of the coefficients. Thus a composite color signal for obtaining a picture image is formed by alternately synthesizing the first and the second color picture signals for each horizontal line period.

Figure 7:
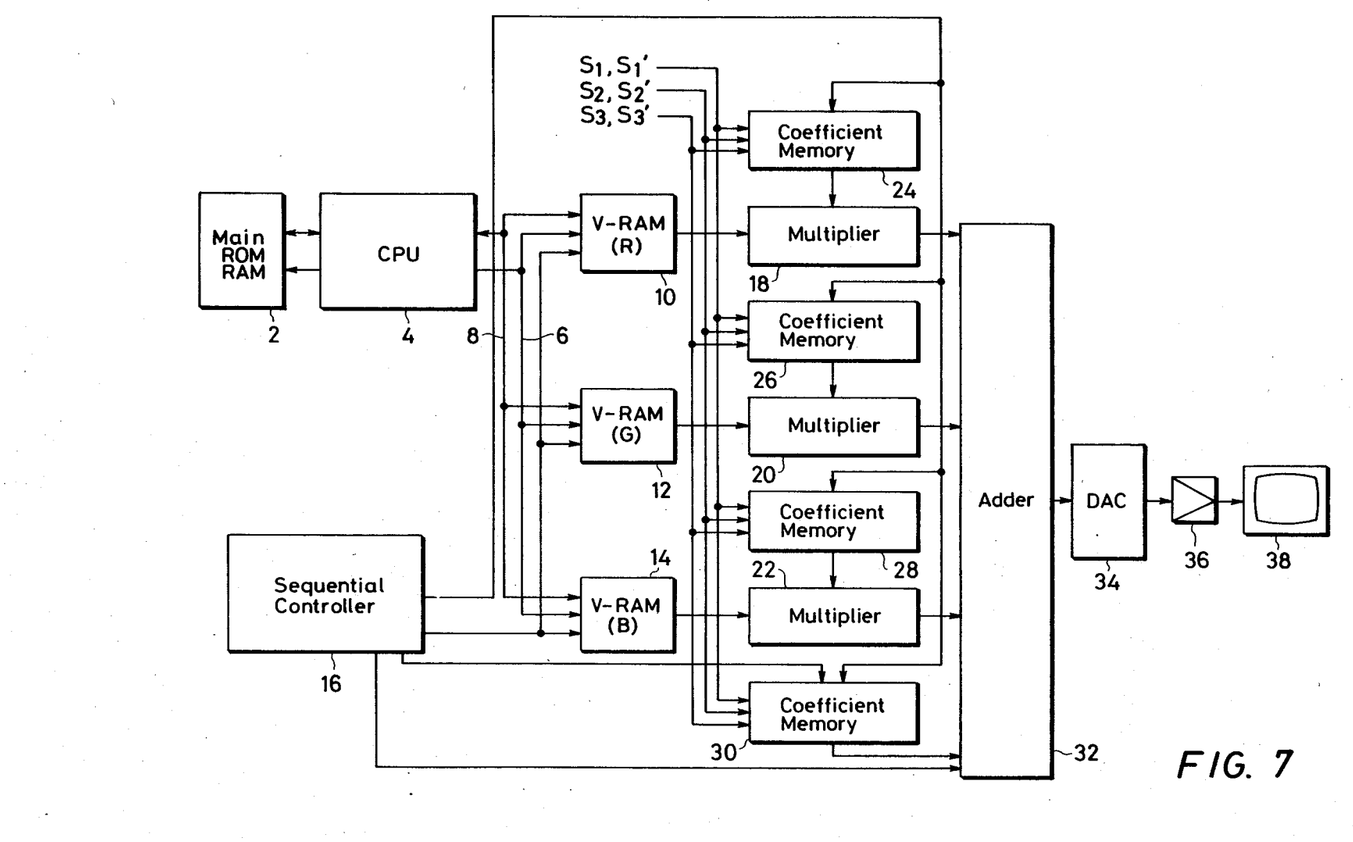
FIG. 7 is a block diagram showing further embodiment of the digital color encoder according to the present invention.

FIG. 7 shows a further embodiment of the digital color encoder according to the present invention, so formed as to be capable of forming the above discussed composite color signal. This embodiment wherein the same reference numerals are attached respectively to the components identical with or similar to those of the embodiment shown in FIG. 1 is only different from the embodiments shown in FIGS. 1 and 4 in respect that the respective coefficient memories 24, 26 and 28 store the coefficients of the respective phases relating to R, G and B of the first and the second color picture signals to provide coefficients triggered by the coefficient selecting timing signals supplied from the sequential controller 16 and by the phase sampling signals $S_1$, $S_2$ and $S_3$ or $S_1'$, $S_2'$ and $S_3'$ and that the coefficient memory 30 memorizes a color burst signal to produce the color burst signal corresponding to the first and the second color picture signal by the color burst timing signal from the sequential controller 16 together with the above mentioned phase sampling signals $S_1$, $S_2$, $S_3$, $S_1'$, $S_2'$ and $S_3'$. In this case, $S_1$, $S_2$ and $S_3$, are phase sampling signals in the case of reading out the coeffcients for the first color picture signal, and $S_1'$, $S_2'$ and $S_3'$ are phase sampling signals in the case of reading out the coefficients for the second color picture signal, and the phases of the former set is different from the respective phases of the latter set by an amount of 180 degrees from each other, for example, if the phase sampling signals for the first horizontal line scanning are $S_1$ (0°), $S_2$ (120°) and $S_3$ (240°), the phase sampling signals for the second horizontal line scanning will be switched over to $S_1'$ (180°), $S_2'$ (300°) and $S_3'$ (60°). Further, when the first color picture signal represented by the formula (1)' and the second color picture signal represented by the formula (10) are separately sampled with a sampling frequency which is an odd number times as high as the chrominance subcarrier frequency (f=3.579545 MHz), the respective coefficients will be obtained for the respective phases (angular periods) of the respective primary color signals and will be given in the numerical values different respectively for the first and the second color picture signals. In the adder 32, the outputs of the multipliers 18, 20 and 22 are combined with respect to the respective terms of R, G and B of the formulae (5)', (6)' and (7)' as the first color picture signal and to the respective terms of R, G and B of the formulae (5)", (6)" and (7)" as the second color picture signal. Thus, the primary color signals R, G and B of the respective phases of the first color picture signal and the primary color signals R, G and B of the respecitve phases of the second color picture signal are read out alternately for each horizontal line scanning period. On the other hand, the timing signal for selecting the coefficients corresponding to the first or the second color picture signal and the phase smapling signals $S_1$ (0°), $S_2$ (120°), $S_3$ (240°), $S_1'$ (180°), $S_2'$ (300°) and $S_3'$ (60°) are applied to the coefficient memories 24, 26 and 28, and thus the coefficients for the respective phases of the respective primary color signals are read out. The same as in the above mentioned primary color signals, the coefficients corresponding to the first and the second color picture signal are read out alternately for each horizontal line scanning of the TV receiver 38.

Figure 8:
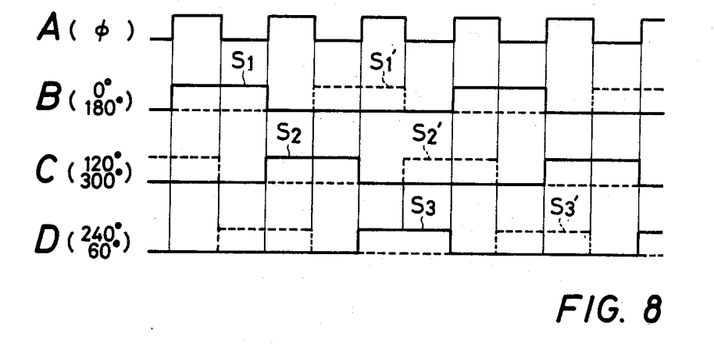
FIG. 8 is an explanatory wave chart showing 3-phase sampling signals for the first color picture signal and 3-phase sampling signals for the second color picture signal.

The selected coefficients for the respective phases of the first or the second color picture signal and the above mentioned primary color signals R, G and B are processed for the respective phases by the multipliers 18, 20 and 22 on the basis of a predetermined sampling frequency, and the color picture signal samples of the respective phases of the first color picture signal and color picture signal samples of the respective phases of the second color picture signal are synthesized alternately for each horizontal line operation to form a synthesized color picture signal for obtaining a picture image. FIG. 8 shows a sampling clock signal and 3-phase sampling signals. In the drawing, $S_1$, $S_2$ and $S_3$ represent phase sampling singals for the first color picture signal and are three-phase signals which have the same frequency as of the chrominance subcarrier and are staggered in phase by 120 degrees with one another and in which the high level period is set to be as long as the sampling clock period. $S_1'$, $S_2'$ and $S_3'$ represent phase sampling signals for the second color picture signal and their frequency, phase differences and high level period are the same as of the phase sampling singals $S_1$, $S_2$ and $S_3$. In contrast with the phase sampling signals $S_1$ (0°), $S_2$ (120°) and $S_3$ (240°) for the first color picture signal, the phase sampling signals for the second color picture signal are $S_1'$ (180°), $S_2'$ (300°) and $S_3'$ (60°), and therefore the phase sampling signals for the first and second color picture signals have a phase difference of 180 degrees with each other. Therefore, as the coefficients read out individually with the respective phase signals $S_1$, $S_2$ and $S_3$ and phase signals $S_1'$, $S_2'$ and $S_3'$ are multiplied successively by the primary color signals, the processing is synchronized with the sampling clock. The color burst signal read out of the coefficient memory and synchronizing signals will be combined with the color picture signals of the respective phases by the adder 32 to form a digital composite color signal. In this case, the relations between the synchronizing signals and the color burst signal are as already described with reference to FIG. 3.

Figure 9:
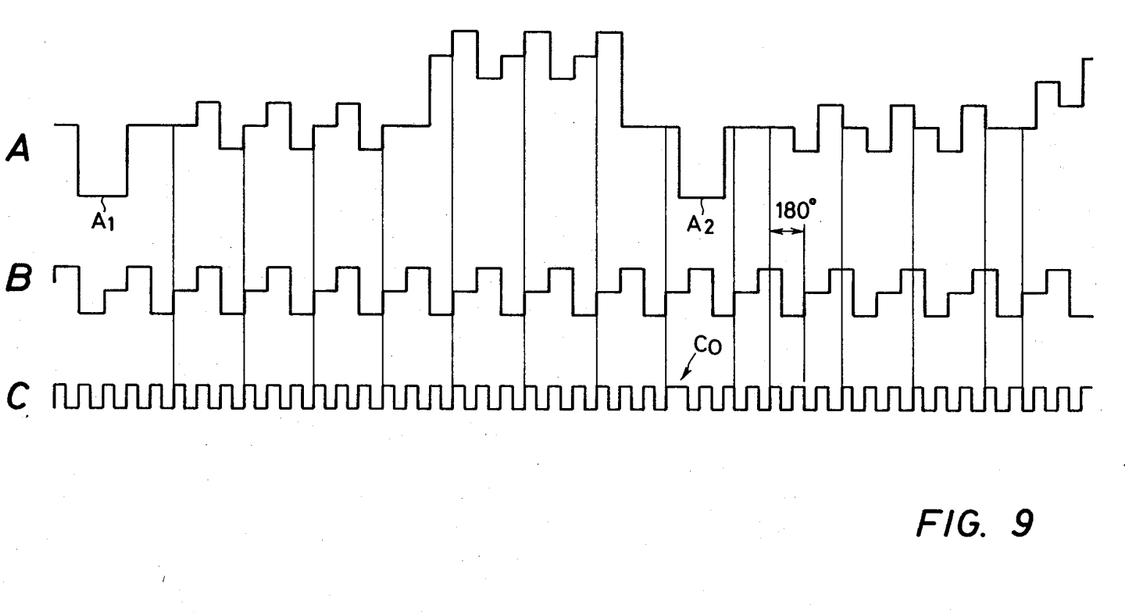
FIG. 9 is an explanatory wave chart showing a composite color signal, a synthesized color picture signal and a sampling clock signal according to the present invention.

In FIG. 9, A represents a composite color signal, B represents a synthesized color picture signal and C represents a clock signal of 10.738635 MHz. That is to say, in case the sampling frequency is set to be an odd number times, for example, 3 times (=10.738635 MHz) as high as the chrominance subcarrier frequency, if this freqeuency is divided by a horizontal scanning frequency of 15.73426 kHz of the TV receiver, the calculated result will not be an integer as shown by the formula (5). Therefore, in order to compensate it, a portion of the clock signal is extended as shown by $C_0$ in the diagram by an amount which is a residue due to a non-integer ratio. Such extnesion will be required in the case of setting a sampling frequency 3 times as high as the chrominance subcarrier frequency, but will not be required in the case of setting the sampling frequency to be 4 times as high.

By the way, in the embodiment, the sampling frequency which is 3 times (=10.738635 MHz) as high as the chrominance subcarrier frequency has been exemplified and explained but the sampling frequency can be set to be any odd number (more than two) times as high as the chrominance subcarrier frequency.

The timing signals given to the respective coefficient memories 24, 26, 28 and 30 from the sequential controller 16 become switching signals for the coefficient memories memorizing the coefficients for the first and second color picture signals and therefore can be used as address signals of the coefficient memories the same as the phase sampling singnals.

As explained above, according to the third embodiment of the present invention, the first color picture signal and second color picture signal having a phase difference of 180 degrees with each other are analyzed by sampling with a sampling frequency which is an odd number times as high as the chrominance subcarrier frequency. The coefficients prepared for the respective phases are multiplied by the digitized primary color signals on the basis of a predetermined sampling frequency to produce color picture signals of the respective phases of the first color picture signal and color picture signals of the respective phases of the second color picture signal, and the color picture signals of the respective phases of the first and second color picture signals are synthesized alternately for each horizontal line operation to form a composite color signal for obtaining a picture image. Therefore, an accurate composite color signal of NTSC can be produced by using a sampling frequency which is an odd number times as high as the chrominance subcarrier frequency, and as a result an accurate picture image can be realized.

What is claimed is:

1. A digital color encoder for synthesizing a composite color video signal of a modulated chrominance subcarrier, comprising:

sampling signal generator means for generating a sampling clock signal having a frequency which is n times as high as a frequency of the chrominance subcarrier, where n is an integer greater than two, and for generating n-phase sampling signals respectively staggered in phase by 360/n degrees and having said subcarrier frequency;

sampled primary color signal producing means for producing color image signals which are digital representations of respective primary colors, and are sampled at said frequency of said sampling clock signal;

coefficient providing means for providing, in response to said n-phase sampling signals, predetermined coefficients which are digital representations of the respective staggered phases for the respective primary color image signals, said coefficients being determined as values which appear as coefficients to the respective primary color image signals as expressed in a formula indicative of the composite color video signal at the respective sampling phases;

multiplying means for multiplying said sampled primary color image signals by said respective coefficients at the respective corresponding phases; and combining means for combining outputs from said multiplying means, thereby forming a synthesized color video signal.

2. A digital color encoder according to claim 1, wherein said coefficient providing means includes at least one coefficient memory means being also for variably setting values of the coefficients.

3. A digital color encoder according to claim 2, wherein said coefficient memories are random access memories.

4. A digital color encoder according to claim 2, wherein said coefficient memories are registers.

5. A digital color encoder according to claim 1, wherein said integer n is an odd number, said coefficient providing means provides a first and a second coefficient for each of said phases for the respective primary color image signals to form a first and a second composite color video signal having subcarrier phases differing from each other by 180 degrees, said first and second coefficients being provided alternately for each horizontal line period, and said combining means is also for forming said first composite color video signal and said second composite color video signal alternatively for each horizontal line period, thereby synthesizing a color video signal.

6. An encoder as in claim 1, wherein said formulas for respective sampling phases include:

$E\ (0\pi/3\omega) = 0.91378R + 0.07220G + 0.01402B;$ $E\ (2\pi/3\omega) = -0.13605R + 0.59378G + 0.54227B;$ and $E\ (4\pi/3\omega) = 0.11927R + 1.09502G + 0.21492B.$ 7. An encoder as in claim 5, wherein said formulas for respective sampling phases include:

$E_1\ (0\pi/3\omega) = 0.91378R + 0.07220G + 0.01402B;$ $E_1\ (2\pi/3\omega) = -0.13605R + 0.59378G + 0.54227B;$ $E_1\ (4\pi/3\omega) = 0.11927R + 1.09502G - 0.21429B;$ $E_2\ (3\pi/3\omega) = -0.31578R + 1.10180G + 0.21398B;$ $E_2\ (5\pi/3\omega) = 0.47873R + 0.07898G + 0.44229B;$ and $E_2\ (7\pi/3\omega) = 0.73405R + 0.58022G + 0.31427B.$

* * * * *